United States Patent
Boerger

(10) Patent No.: US 7,814,246 B2
(45) Date of Patent: Oct. 12, 2010

(54) TRANSLATION OF DATA TO/FROM STORAGE DEVICES BASED ON A REDUNDANCY CONFIGURATION AND HOST INTERFACE TYPE

(75) Inventor: Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 11/742,531

(22) Filed: Apr. 30, 2007

(65) Prior Publication Data

US 2008/0270669 A1   Oct. 30, 2008

(51) Int. Cl.
*G06F 13/12* (2006.01)
*G06F 13/36* (2006.01)

(52) U.S. Cl. .......... 710/62; 710/306

(58) Field of Classification Search .......... 710/62, 710/306
See application file for complete search history.

(56) References Cited

U.S. PATENT DOCUMENTS

| | | | |
|---|---|---|---|
| 6,629,158 B1 * | 9/2003 | Brant et al. | 710/10 |
| 2005/0060478 A1 * | 3/2005 | Wu et al. | 710/306 |
| 2006/0242312 A1 * | 10/2006 | Crespi et al. | 709/230 |

* cited by examiner

*Primary Examiner*—Henry W Tsai
*Assistant Examiner*—Hyun Nam

(57) ABSTRACT

A system comprises a bridge translator adapted to be coupled to a plurality of storage devices and to a host. The bridge translator translates data from the host to a format compatible with the redundantly configured storage devices. A controller coupled to the bridge translator configures the bridge translator to translate the data based on a redundancy configuration of the storage devices and based on a type of interface to the host.

14 Claims, 4 Drawing Sheets

TRANSLATION OF DATA TO/FROM STORAGE DEVICES BASED ON A REDUNDANCY CONFIGURATION AND HOST INTERFACE TYPE

BACKGROUND

A storage expansion unit can accommodate one or more storage devices (e.g., hard disk drives). The storage expansion unit couples to a host system. As the name suggests, a storage expansion unit expands the storage capacity of the associated host system. The storage expansion unit couples to the associated host system via an electrical cable over which a predefined communication protocol is implemented. Having a storage expansion unit that implements a predefined communication protocol reduces or eliminates the flexibility of the storage expansion unit to be coupled to different host systems using different communication protocols.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to the combination of two or more components and includes a complete operative system and subsystems thereof.

DETAILED DESCRIPTION

Figure 1:
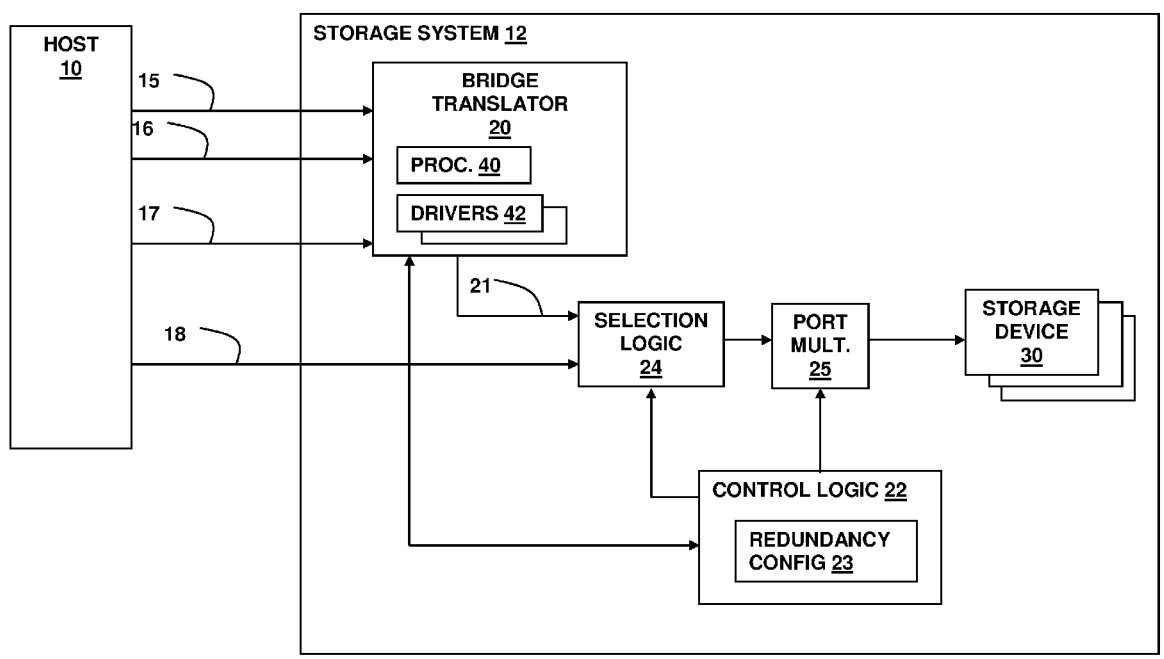
FIG. 1 shows a system in accordance with various embodiments.

FIG. 1 shows a host system 10 coupled to a storage system 12 (referred to herein as a "storage system") via any one of multiple host interfaces 15, 16, 17, and 18. The host system 10 comprises any type of computing device for which storage system 12 provides storage. In accordance with at least some embodiments, host system 10 comprises a computer (desktop computer, notebook computer, server, etc.).

In accordance with various embodiments, storage system 12 comprises a bridge translator 20, control object 22, selection logic 24, a port multiplier 25, and one or more storage devices 30. The storage devices comprise any of hard disk drives, tape drives, Flash memory modules, or any other form of volatile or nonvolatile storage. In various embodiments, the storage system 12 comprises receiving bays into which each storage device 30 can be installed. As shown in FIG. 1, the bridge translator 20 couples to the selection logic 24 and control logic 22. The selection logic 24 couples to the control logic 22 and to the port multiplier 25, which also couples to the control logic 22 as shown. The port multiplier 25 couples to the storage devices 30. Read and write access transactions are provided to the storage devices 30 through the port multiplier 25. The port multiplier 25 enables multiple hard drives to be accessed via a single port/connection.

The storage devices 30 are configured into one of multiple redundancy configurations. Examples of such redundancy configurations comprise Just a Bunch of Disks (JBOD), Redundant Array of Inexpensive Disks (RAID)0, RAID0/1, RAID1, RAID2, RAID3, RAID4, RAID5, and RAID6. In various embodiments, the particular redundancy configuration is user-selectable in various embodiments such as that described in U.S. Pat. No. 6,629,158 and Pat. Pub. No. 2005/0268036, both of which are incorporated herein by reference. The control logic 22 comprises storage 23 in which an identity of the redundancy configuration of the storage devices 30 is stored.

The host 10 couples to the storage system 12 via one of multiple possible host interfaces 15-18. While four host interfaces 15-18 are illustrated in FIG. 1, it should be understood that, in various embodiments, only one host interface is implemented at any one point in time to couple the host 10 to the storage system 12. That is, in some embodiments, only one communication link between the host system 10 and the storage system 12 is active at any point in time. Multiple host interfaces 15-18 are shown in FIG. 1 to illustrate that the storage system 12 is adapted to couple to a host system via any one of multiple host interface types. Examples of the various host interfaces 15-18 comprise Gigabit Ethernet, Universal Serial Bus (USB), IEEE 1394, and Serial Advanced Technology Attachment (SATA).

One or more of the host interfaces 15-17 are coupled to the storage system's bridge translator 20 as shown. The bridge translator 20 converts the data and messages (collectively referred to as "data") received from the host 10 over the applicable host interface 15-17 to a format compatible with the storage devices 30. The bridge translator 20 also converts the data received from the storage devices 30 to a format compatible with host 10. For example, the storage devices 30 may be compatible with the SATA standard and the storage system 12 may be coupled to host system 10 via a USB interface. In this example, the bridge translator 20 converts between the host's USB protocol and the storage device's SATA protocol to thereby enable the host system 10 to write data to, and read data from, a SATA-based storage device 30.

Referring still to FIG. 1, the storage system 12 may be coupled to a host 10 using a communication protocol that is already compatible with the storage devices 30. In the example in which the storage devices 30 comprise SATA-based hard drives, the host system 10 may be coupled to the storage system 10 using host interface 18 that is already in accordance with the SATA protocol. Accordingly, no translation between the host 10 and the storage devices 30 is necessary. Selection logic 24 is provided in the storage system 12 to receive translated data over any of host interfaces 15-17 from bridge translator 20 via connection 21 or data directly from the host via host interface 18. The selection logic 24 provides the relevant data to the port multiplier 25, which then interacts with the storage devices 30 as described above. The selection logic 24 is controlled by the control logic 22. The control logic 22 controls the state of the selection logic 24 depending on whether the bridge translator 20 comprises the active communication link back to the host 10, or whether the active communication link back to host 10 is via the untranslated host interface 18.

Figure 2:
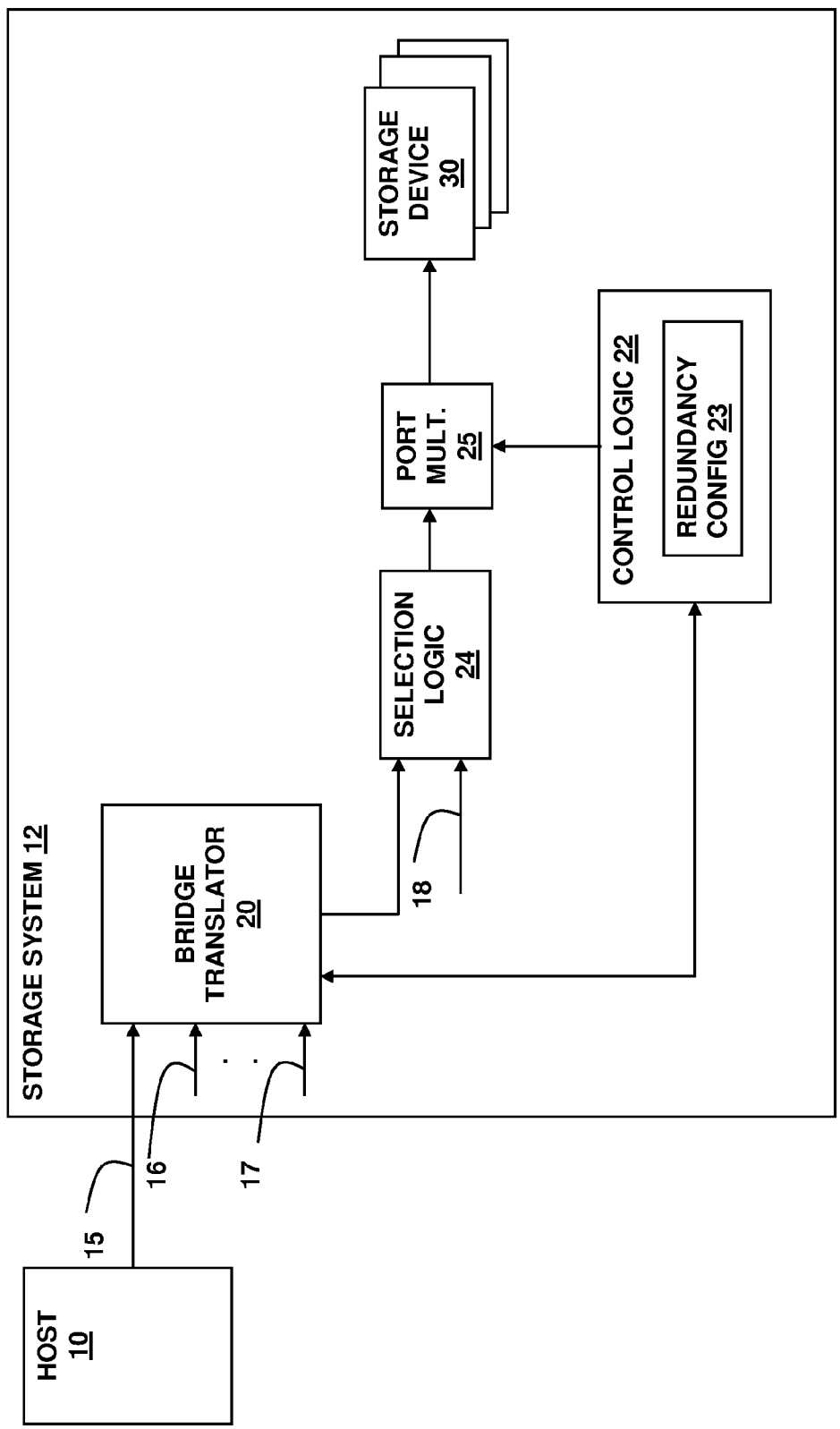
FIG. 2 shows an example of the use of the system of FIG. 1.

FIG. 2 illustrates an example in which the host 10 is coupled to the storage system 12 using host interface 15. Host interface 15 comprises a communication protocol that is incompatible with the storage devices 30 and thus bridge translator 20 is used to convert the data back and forth between the host 10 and the storage devices 30. The remaining host interfaces 16, 17, and 18 are unused in this example.

Figure 3:
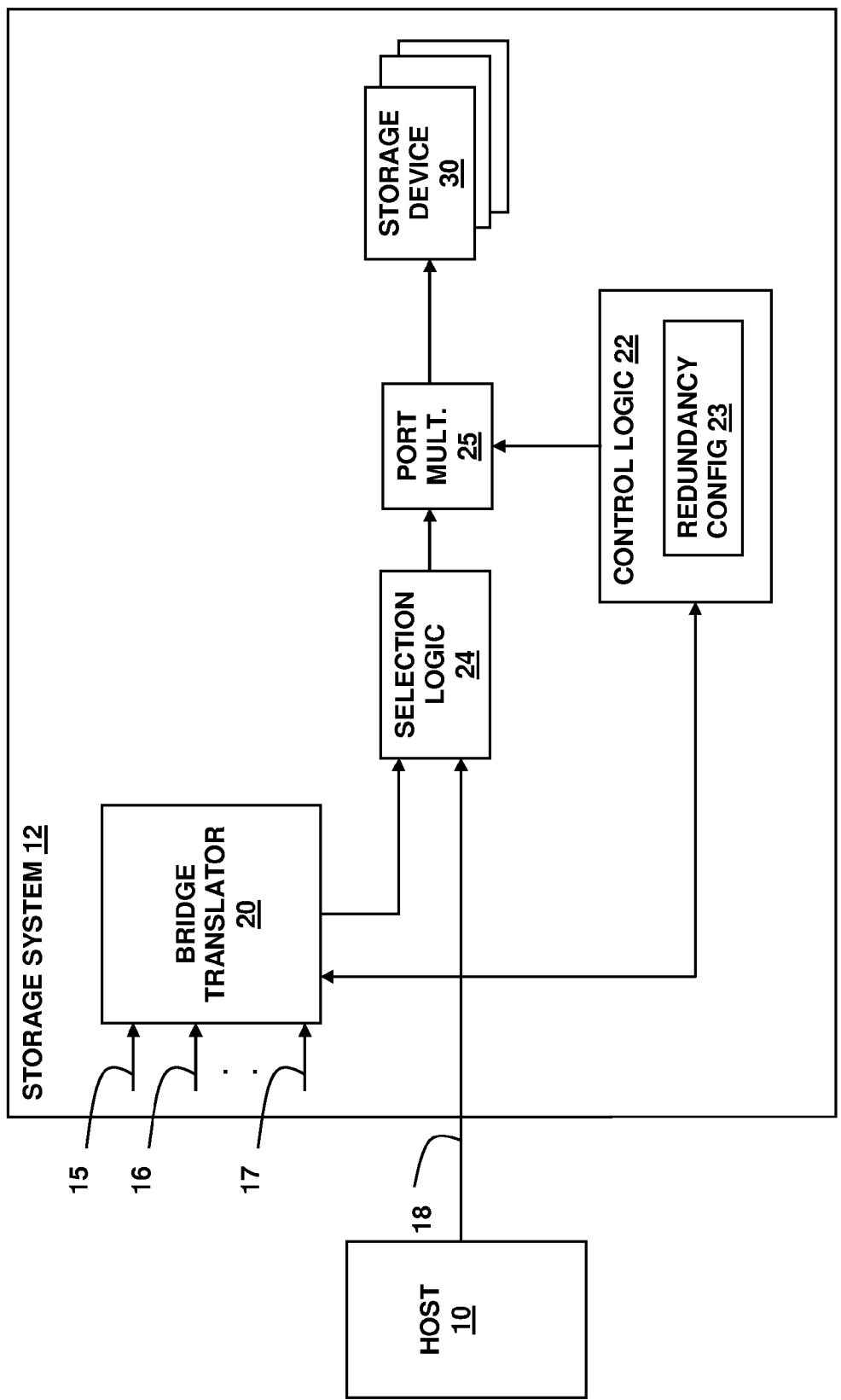
FIG. 3 shows another example of the use of the system of FIG. 1.

FIG. 3 illustrates another example in which the host 10 couples to the storage system 12 via host interface 18. In this example, the host interface 10 provides communications to the storage system 12 in accordance with a communication protocol that is already compatible with the storage devices 30. In this example, the bridge translator 20 is not needed and thus host interfaces 15, 16, and 17 remain unused.

Referring again to FIG. 1, the bridge translator 20 comprises a processor 40 that executes code in accordance with various embodiments. At least one type of code that the bridge translator 20 executes is a driver 42 that enables the bridge translator 20 to translate between implemented interface types. For example, the bridge translator 20 executes a driver that translates data between the communication protocol implemented on a host interface 15 and the communication protocol of the storage devices 30. Similarly, the bridge translator 20 executes a driver that translates data between the communication protocol of host interface 16 and storage devices 30. The bridge translator 20 also executes a driver that translates between the communication protocol of host interface 17 and the storage devices 30. In some embodiments, a different driver 42 is accessible to bridge translator 20 for the various host interfaces 15-17.

The storage system 12 is flexible enough to be coupled to a host system 10 that implements any of the host interface types supported by the storage system 12 (host interfaces 15-18). As such, if one of host interfaces 15-17 is the active host interface, the bridge translator 20 is loaded with the correct driver to support the active host interface. During initialization of the storage system 12, or at other times, the bridge translator 20 submits a request to the control logic 22 to report the implemented redundancy configuration 23 of the storage devices 30. The control logic 22 provides the identity of the redundancy configuration to the bridge translator 20. The bridge translator 20 then selects the appropriate driver 42 to use based on the redundancy configuration of the storage devices 30 and based on the active host interface 15-17 used for the host 10. The various drivers 42 may be pre-stored in the bridge translator 20 or elsewhere within the storage system 12. In at least some embodiments, the bridge translator 20 automatically loads (i.e., without human involvement) the correct driver to support the required translation type.

Because the bridge translator 20 can be automatically configured to permit different hosts 10 with different host interfaces to access the storage devices 30, the storage system 12 provides considerable flexibility. For example, the storage system 12 can be coupled to a first host system 10 via host interface 15, and then subsequently coupled to a second host system 10 via host interface 16. The bridge translator 20 is automatically configured (e.g., loaded with the appropriate driver 42) each time the storage system 12 is coupled to a different host system 10. This flexibility of the storage system 12 permits the storage system 12 to be portable and thus used with different host systems 10. The automatic reconfigurability of the bridge translator 20 to the storage system 12 also permits a user to replace the host system 10 as desired with another host system that implements a different host interface.

Figure 4:
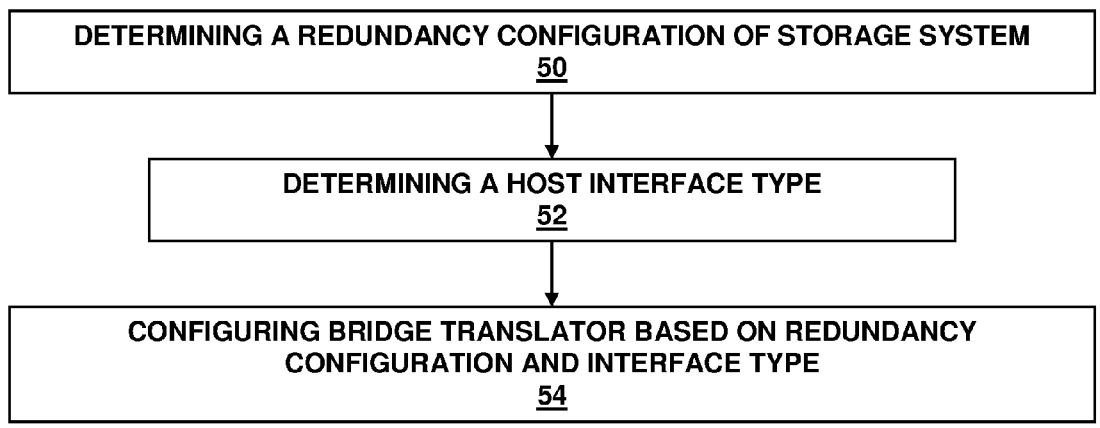
FIG. 4 shows a method in accordance with various embodiments.

FIG. 4 illustrates a method in accordance with various embodiments. At 50, the method comprises determining the redundancy configuration of the storage system 12. At 52, the method comprises determining the type of host interface by which the storage system 12 couples to the host 10. At 54, the method comprises configuring the bridge translator 20 based on the determined redundancy configuration and also based on the determined interface type.

As explained previously, the storage system 12 also provides a host interface type 18 that is not provided to the bridge translator 20. The host interface 18 presumably is already compatible with the communication protocol of the storage devices 30 and therefore needs no translation. This feature of the storage system 12 enables the storage system 12 to be coupled to a host 10 via an interface type that is already compatible with the storage devices 30. In such embodiments, the host 10 may implement the functionality of the storage system's bridge translator 20. That is, the host system 10 executes a driver that converts data generated within the host system 10 to a format compatible with the storage devices 30. In such embodiments, the host system 10 performs the translation function of the bridge translator 20 and thus the bridge translator 20 need not be used.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a bridge translator comprising a plurality of host interfaces of different types, said bridge translator configured to couple to a plurality of redundantly configured storage devices and to a host over at least one of said host interfaces, said bridge translator also translates data received from the host over said at least one of said host interfaces to a format compatible with the redundantly configured storage devices;
a controller coupled to said bridge translator, said controller configures said bridge translator to translate the data based on a redundancy configuration of said storage devices and based on the type of host interface over which said data is received; and
a selection logic coupled to said bridge translator and configured to couple to said redundantly configured storage devices and to a host via a host interface, wherein said selection logic, in response to a signal from the controller, selects data from one of the bridge translator and the host interface to be provided to the redundantly configured storage devices wherein data selected by the selection to is from the host interface is provided by the host interface directly to the selection logic.

2. The system of claim 1 further comprising a port multiplier coupled to said controller and adapted to couple to said redundantly configured storage devices.

3. The system of claim 1 wherein the bridge translator executes a driver that translates the data from the host to the format compatible with the redundantly configured storage devices.

4. The system of claim 1 wherein the bridge translator accesses the controller to determine the redundancy configuration of the storage devices.

5. The system of claim 4 wherein the bridge translator selects a driver at least based on the determined redundancy configuration of the storage devices, the driver translates the data from the host to the format compatible with the redundantly configured storage devices.

6. The system of claim 5 wherein the bridge translator selects the driver based also on the type of interface to the host.

7. An apparatus, comprising:
- a plurality of redundantly configured storage devices configured to store data received from a host;
- a bridge translator coupled to said plurality of storage devices and comprising a plurality of host interfaces of different types, said bridge translator translates data from the host to a format compatible with the redundantly configured storage devices;
- a controller coupled to said bridge translator, said controller configures said bridge translator to translate the data based on a redundancy configuration of said storage devices and based on the type of interface to the host; and
- a selection logic coupled to said bridle translator said redundantly configured storage devices and to a host via a host interface, wherein said selection logic, in response to a signal from the controller, selects data from one of the bridge translator and the host interface to be provided to the redundantly configured storage devices, wherein data selected by the selection logic from the host interface is provided by the host interface directly to the selection logic.

8. The apparatus of claim 7 wherein the bridge translator retrieves the redundancy configuration of said redundantly configured storage devices from the controller.

9. The apparatus of claim 7 wherein the bridge translator executes a driver from among a plurality of drivers stored in said apparatus, each of said plurality of drivers configured to translate data from the host to a format compatible with the redundantly configured storage devices.

10. The apparatus of claim 7 wherein the bridge translator selects the driver from among the plurality of drivers stored in said apparatus based on the redundancy configuration of said storage devices and based on the type of interface to the host.

11. A method, comprising:
- determining a redundancy configuration of a storage system;
- from among a plurality of available host interface types on said storage system, determining an interface type of a host coupled to said storage system;
- based on a control signal, selecting data, by selection logic, from one of a bridge translator and a host interface, wherein data selected from the host interface is provided directly from the host to the selection logic; and
- based on data being selected from the host interface configuring the bridge translator to translate data from said host to said storage system based on said determined redundancy configuration and interface type.

12. The method of claim 11 wherein configuring the bridge translator comprises automatically configuring the bridge translator upon coupling the storage system to the host.

13. The method of claim 11 wherein configuring the bridge translator comprises selecting a driver from among a plurality of drivers.

14. The method of claim 13 further comprising executing said selected driver to translate data from said host to said storage system.

* * * * *

UNITED STATES PATENT AND TRADEMARK OFFICE
CERTIFICATE OF CORRECTION

| | | |
|---|---|---|
| PATENT NO. | : 7,814,246 B2 | Page 1 of 1 |
| APPLICATION NO. | : 11/742531 | |
| DATED | : October 12, 2010 | |
| INVENTOR(S) | : Paul Boerger | |

It is certified that error appears in the above-identified patent and that said Letters Patent is hereby corrected as shown below:

In column 4, line 55, in Claim 1, delete "devices" and insert -- devices, --, therefor.

In column 4, line 56, in Claim 1, delete "to is" and insert -- logic --, therefor.

In column 5, line 22, in Claim 7, delete "bridle translator" and insert -- bridge translator, --, therefor.

In column 6, line 20, in Claim 11, delete "interface" and insert -- interface, --, therefor.

Signed and Sealed this
Fifteenth Day of March, 2011

David J. Kappos
*Director of the United States Patent and Trademark Office*